July 22, 1952

L. W. MAHLE 2,604,056

CHEWING GUM MANUFACTURE

Filed Feb. 16, 1948

Inventor
LOUIS WILLIAM MAHLE

By *James M. Ginns*

ATTORNEY

July 22, 1952 L. W. MAHLE 2,604,056
CHEWING GUM MANUFACTURE
Filed Feb. 16, 1948 3 Sheets-Sheet 2

Inventor
LOUIS WILLIAM MAHLE

ATTORNEY

July 22, 1952  L. W. MAHLE  2,604,056
CHEWING GUM MANUFACTURE
Filed Feb. 16, 1948  3 Sheets-Sheet 3

Inventor
LOUIS WILLIAM MAHLE
By
ATTORNEY

Patented July 22, 1952

2,604,056

UNITED STATES PATENT OFFICE 2,604,056

CHEWING GUM MANUFACTURE

Louis William Mahle, Abington, Pa., assignor to Frank H. Fleer Corporation, Philadelphia, Pa., a corporation of Delaware Application February 16, 1948, Serial No. 8,539

5 Claims. (Cl. 107—1)

This invention relates to a new and improved apparatus for preparing laminated chewing gum and more particularly to a novel process and apparatus for producing a laminated chewing gum of the stick variety made of an inner layer of candy or like confectionery material and two adhering outer layers of chewing gum, or of an inner layer of chewing gum and two adhering outer layers of candy.

Laminated chewing gum, of the foregoing character, or so-called chewing gum "sandwiches," are not broadly new per se, the basic concept being disclosed in the U. S. patents to Gilbert B. Mustin Nos. 1,771,506, 1,771,981 and 1,771,982, all issued on July 29, 1930. The first of these patents discloses and claims a method for making chewing gum sandwiches wherein there is provided an inner layer of candy and two outer layers of chewing gum, while the two latter patents show processes for preparing laminated chewing gum wherein the inner layer is composed of chewing gum material and the two outer layers are made of candy.

While the present invention is to be described with respect to a laminate having an inner layer of candy and two outer layers of chewing gum, it is to be understood that the invention also contemplates the production of a laminate in which these layers are reversed, so to speak. In other words, the apparatus of the invention is perfectly capable of producing a laminate having an inner layer of gum and two outer layers of candy.

The disadvantages of the process and apparatus disclosed in Mustin Patent No. 1, 771,506, showing the production of a chewing gum laminate of the general character with which the present invention is concerned, are readily apparent. In the first place, this prior Mustin process, as can be ascertained from a cursory inspection of the disclosure, is obviously prophetic at most and involves nothing more nor less than the basic concept of producing the three layer product. The schematic and diagrammatic apparatus showing in the Mustin patent drawings serve only to emphasize this. The gum and candy layers are, in reality, merely "pulled" through a series of rolls which would result in layers of varying thicknesses making for a completely non-uniform final laminate. Furthermore, it will be noted that the Mustin patent depends on three separate and distinct devices for forming each layer of the laminate.

It is, accordingly, one of the main and salient objects of the present invention to provide apparatus for manufacturing a chewing gum laminate having an inner layer of candy or like confectionery and two outer layers of chewing gum, or the reverse, as previously pointed out, wherein the foregoing and other inherent disadvantages of the process and schematic apparatus of Mustin Patent No. 1,771,506 are entirely obviated.

It is a further object to provide a novel arrangement of efficient apparatus units effective to produce a chewing gum laminate of the foregoing character.

Reference is now had to the accompanying drawings, in which

Figure 1:
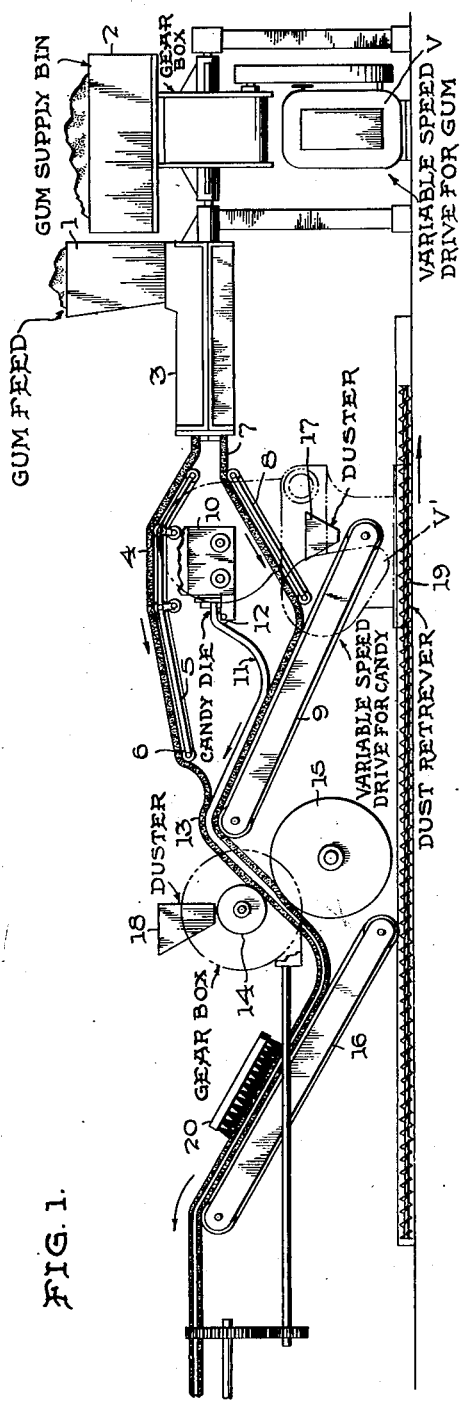
Fig. 1 is a side elevation of the apparatus showing the principal or essential parts thereof in cooperative relation.
Figure 2:
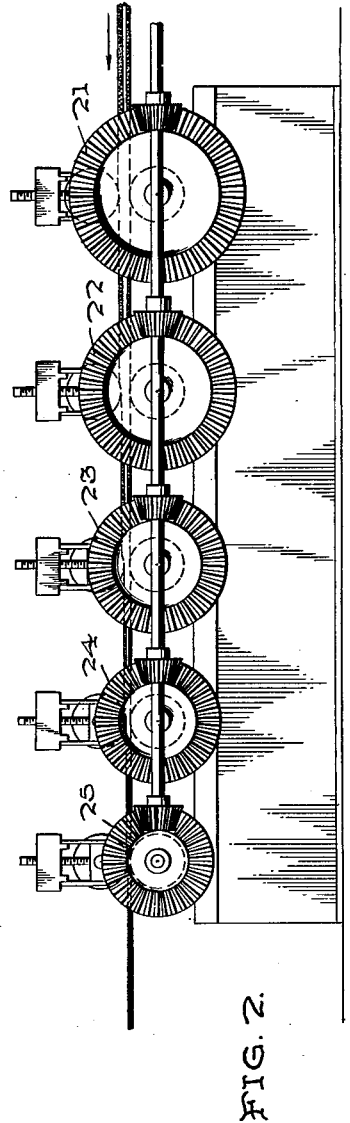
Fig. 2 is a side elevation of the series of sheet-size-reducing rolls which are positioned immediately to the left of, and which constitute a continuation of, the apparatus shown in Fig. 1.

Referring now to Figs. 1 and 2 of the drawings, illustrating the general combination of elements making up the apparatus of the present invention, chewing gum of desired composition and consistency is supplied manually to a hopper 1 from gum supply bin 2, where it passes to gum extruder generally designated by the reference character 3. This gum extruder, as will be pointed out more particularly hereinafter, is of the force feed or pressure screw or worm type and is provided with a double die whereby two separate and distinct layers of chewing gum are extruded one above the other. The top layer of chewing gum 4 coming from the extruder 3 is fed up and into an endless belt 5 which is hinged as at 6 so that it may be lifted out of the way when necessary to clean the candy extruder. The lower gum layer 7 is fed down over an endless belt 8 and then up onto another endless belt 9. Endless belts 5, 8 and 9 are all driven in synchronism.

Positioned between the two endless belts 5 and 8 in advance of the gum extruder 3 is the candy extruder generally designated at 10. Into this extruder, from either side of the advancing gum layers 4 and 7, is fed manually candy or other confectionery of the desired composition and consistency. The layer of candy 11 is forced through the die of this candy extruder 10 and allowed to fall over idler roll 12 onto the lower gum layer 7. The three layers of the laminate, upper gum layer 4, middle candy layer 11 and lower gum layer 7 meet and are combined at a point 13 whence the laminated sheet is fed down between steel drum pressure rolls 14 and 15 to reduce the thickness of the laminate at this point to about one-third of its original, uncompressed thickness. From the pressure rolls 14, 15, the thus initially reduced laminate is led onto inclined endless belt 16 to be fed into a series of sizing or reducing rolls.

It is to be noted that the outer surface of the lower gum layer 7 is dusted from bin 17 and that the outer surface of upper gum layer 4 is dusted from bin 18, to prevent adherence to the belts or rolls with which these surfaces come in contact. There is no dusting of the inner surface of the upper and lower gum layers because it is essential that the candy layer adhere firmly to the two outer gum layers. It goes without saying that no dusting medium is used on either side of the candy layer for the same reason. Powdered corn starch or mixtures of corn starch and sugar are used as dusting media. Obviously, any other edible powder or finely ground material could be employed. Any dust which does not adhere to the gum layers falls down into dust retriever 19 and may be re-used in the process. Before the gum-candy laminate proceeds to the sizing or reducing rolls, a portion of the dust is removed by brush 20 disposed at an angle to the advancing composite sheet.

As the gum-candy laminate leaves the endless belt 16 it is fed, as stated, into a series of pairs of smooth steel sizing or reducing rolls generally designated at 21, 22, 23, 24 and 25, such as shown in Fig. 2 of the drawings. The series of reducing rolls, as shown in Fig. 2, is conventional equipment and no claim is made to novelty therein. As shown, however, these reducing rolls are effective to reduce the diameter of the laminate, step by step, to a sheet of gum of the desired thickness. The sheet is then scored and formed into sticks or slabs of gum according to conventional procedure.

Figure 3:
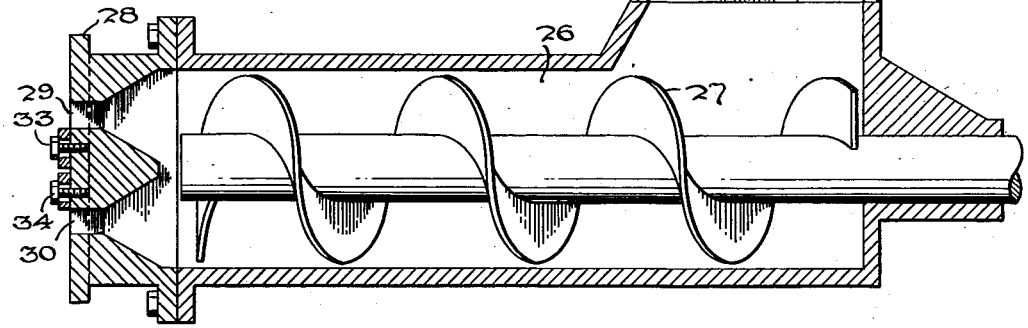
Fig. 3 is a side elevation in section of the gum extruder.
Figure 4:
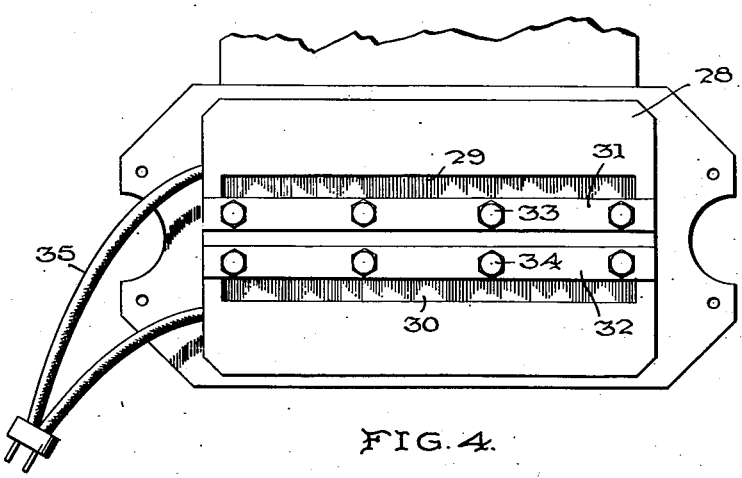
Fig. 4 is a front elevation of the gum extruder.
Figure 5:
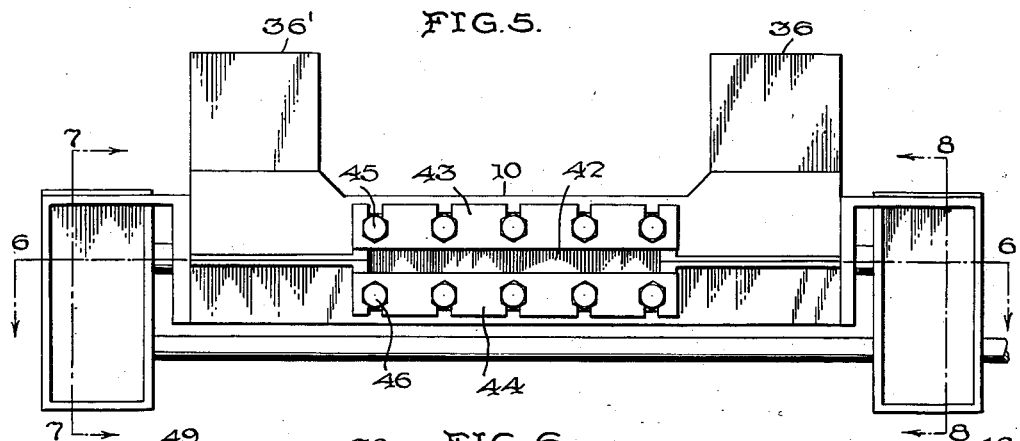
Fig. 5 is a front elevation of the candy extruder.
Figure 6:
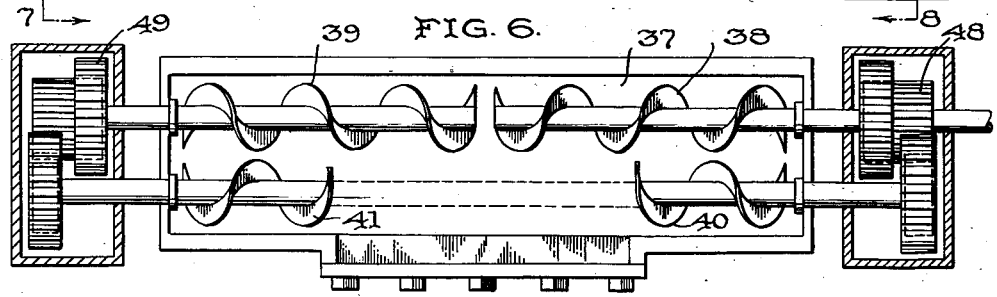
Fig. 6 is a top plan view, partly in section, taken along the line 6—6 of Fig. 5.
Figure 7:
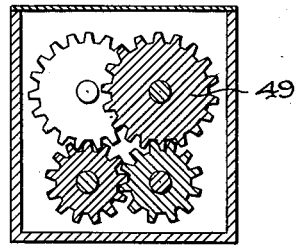
Fig. 7 is a section taken along line 7—7 of Fig. 5.
Figure 8:
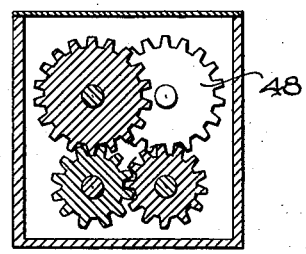
Fig. 8 is a section taken along line 8—8 of Fig. 5.

In Fig. 3 is shown the gum extruder comprising hopper 1, extrusion chamber 26, and a pair of complementary worms or screws 27. Bolted onto the forward end of the extrusion chamber 26 is a double apertured plate 28. The apertured plate 28 is divided to provide two orifice slots 29 and 30 which are adjustable in width through vertically movable slotted elements 31 and 32 which are held by means of sets of upper bolts 33 and lower bolts 34. It is to be noted that in order to reduce the width of the upper or lower orifices it is merely necessary to raise element 31 and lower element 32.

Thus, either upper or lower slots may be varied independently of the other. By this means, the intermediate candy layer may be brought nearer or further from either surface of the final laminated sheet as desired. Or, due to different extrusion rates of the upper and lower gum sheets, it may be necessary at times to open or close one or the other to maintain the intermediate candy layer exactly in the middle of the finished sheet. Complete liberty in extrusion rates can thus be maintained.

Plate 28 is provided with an electric heating element not shown but generally designated by electric conductors 35 which is placed in operation when the process is started in order to produce a smoother sheet of laminated gum. After the machine has been running for one-half hour or longer, the heat of friction in the extruder will suffice to keep the gum smooth and the heater may be shut off.

The candy extruder illustrated in Figs. 5, 6, 7 and 8 of the drawings is a very important feature of the present invention not only in and of itself, but in the way in which it is positioned with respect to the upper and lower gum layers. Referring to the foregoing figures in detail, the candy extruder, which is designated generally at 10, is made up of two identical hoppers 36 and 36' through which the candy or confectionery is fed manually. The candy falls into an extruding chamber 37 by gravity and is forced to the center thereof, from each end, by a series of screws or worms 38, 39, 40 and 41 driven from appropriate gear boxes 48 and 49 of conventional type. Intermediate the hoppers 36 and 37 is an orifice 42 parallel to the axis of the worms and provided with vertically adjustable slotted plates 43, 44. As in the case of the gum extruder, the size of the orifice 42 is varied at will by sliding the plates 43 and 44 upwardly or downwardly and holding them in place by a series of bolts 45 and 46. Worms 40 and 41 are shorter, of course, than worms 38 and 39 so that the compressed candy may have free and unimpeded access to orifice 42. Orifice 42 is positioned directly in line with the two advancing gum sheets.

By virtue of the construction of this candy extruder 10 whereby candy is fed into either side thereof, is propelled from both sides in the extrusion chamber 37 to the center thereof and is then forced out at right angles to the extrusion chamber 37 and the worms working therein, it is possible to position this candy extruder as shown in Fig. 1 without the necessity of spreading upper gum layer 4 and lower gum layer 7 an inordinate distance one from the other. By providing the particular candy extruder shown, in other words, it is possible to feed the candy into hoppers 36 and 37 with great facility from both sides of the layers of gum without interfering in any way with the passage of the two gum strips through the apparatus. Stated differently, since hoppers 36 and 37 are positioned on either side of the passing gum strips, the operator need not reach in between the gum strips for any reason. This is a distinct advantage over the apparatus shown schematically in Mustin Patent No. 1,771,506.

In order to obtain proper coordination of the gum and candy sheets, variable speed drives V and V' (Fig. 1) such as conventional Link-belt variable speed mechanism or Reeves drives are provided to enable the speeds of the components to be varied at will. Thus, if too much gum is being extruded, variable speed drive V may be regulated to reduce the speed of the extruder worms, thus diminishing the amount of gum delivered to the extruder orifices. Since gum is extensible in its warm, soft condition at this point, the gum sheet is pulled thinner and narrower if the speed of the worms is reduced. The same applies with respect to the candy extruder 10. In this connection it should be pointed out that power supplied to the variable speed drive V is from an entirely different source than that supplied to variable speed drive V'. Thus they work entirely independently of each other mechanically. It is also pointed out that endless belts 5, 8 and 9, as well as endless belt 16, are all driven in synchronism from the main line shaft (not shown) at constant speed. Likewise, power to the initial reducing rolls 14 and 15 is taken from the main line shaft as is the power to drive the series of sizing or reducing rolls 21, 22, 23, 24 and 25.

Since it is comparatively very difficult to control exactly the temperature of the gum delivered to the extruders and since the gum and candy vary greatly in their tensile strength at different temperatures, it is very important to provide for the foregoing variable speed drive to adjust for such variations.

While the foregoing description is directed to the production of a three layer laminate, it is to be understood that the invention is not limited to such a laminate. The invention contemplates, in other words, laminates having any desired number of layers of gum and/or candy. Furthermore, the invention includes the production of all-gum laminates to the exclusion of candy layers. There may be provided a laminate made up of alternate layers of different types of gum or gums of different colors or flavors. As a further modification or alternative procedure, the final laminate, instead of being produced in the conventional stick form, may be, through the use of appropriate scoring knives, produced in the form of "pillows" or in the shape of the well-known candy-coated units, in which case the gum may be on the inside of the unit with candy coating on the outside or, conversely, the candy may be inside with a gum coating on the outside.

It is also within the scope of the invention to provide an all-candy laminate. Thus, candy of one type could be extruded through the double extruder and candy of a different type through the single extruder.

What is claimed is:

1. An apparatus for preparing laminated stick chewing gum comprising a single means for simultaneously extruding under pressure two superimposed spaced flat strips of chewing gum, means for elevating and advancing the upper strip of gum, means for lowering and advancing the lower strip of gum, means in advance of said gum extruding means and between said elevating and advancing means for extruding under pressure a single flat strip of candy in the same direction as the advancing strips of gum, said last named extruding means having two feed hoppers, each positioned beyond the running confines of all of the advancing strips, said last named extruding means also having screw means therein for receiving candy fed into both of the hoppers, forcing it from the bottom of the hoppers to the center of the extruding means and thence through a slot at right angles to the screw means, and means for joining the three strips to form a laminate.

2. An apparatus for preparing laminated stick chewing gum comprising a single means for simultaneously extruding under pressure two superimposed spaced flat strips of chewing gum, endless belt means for elevating and advancing the upper strip of gum, endless belt means for lowering and advancing and then raising and advancing the lower strip of gum, means in advance of said gum extruding means and between said endless belt means for extruding under pressure a single flat strip of candy in the same direction as the advancing strips of gum, said last named extruding means having two feed hoppers, each positioned beyond the running confines of all of the advancing strips, said last named extruding means also having screw means therein for receiving candy fed into both of the hoppers, forcing it from the bottom of the hoppers to the center of the extruding means and thence through a slot at right angles to the screw means, and means for joining the three strips to form a laminate.

3. An apparatus for preparing laminated stick chewing gum comprising a single means for simultaneously extruding under pressure two superimposed spaced flat strips of candy, means for elevating and advancing the upper strip of candy, means for lowering and advancing the lower strip of candy, means in advance of said candy extruding means and between said elevating and advancing means for extruding under pressure a single flat strip of chewing gum in the same direction as the advancing strips of candy, said last named extruding means having two feed hoppers, each positioned beyond the running confines of all of the advancing strips, said last named extruding means also having screw means therein for receiving gum fed into both of the hoppers, forcing it from the bottom of the hoppers to the center of the extruding means and thence through a slot at right angles to the screw means, and means for joining the three strips to form a laminate.

4. An apparatus for preparing laminated stick chewing gum comprising a single means for simultaneously extruding under pressure two superimposed spaced flat strips of candy, endless belt means for elevating and advancing the upper strip of candy, endless belt means for lowering and advancing and then raising and advancing the lower strip of candy, means in advance of said candy extruding means and between said endless belt means for extruding under pressure a single flat strip of chewing gum in the same direction as the advancing strips of candy, said last named extruding means having two feed hoppers, each positioned beyond the running confines of all of the advancing strips, said last named extruding means also having screw means therein for receiving gum fed into both of the hoppers, forcing it from the bottom of the hoppers to the center of the extruding means and thence through a slot at right angles to the screw means, and means for joining the three strips to form a laminate.

5. An apparatus for preparing laminated stick chewing gum comprising a single means for simultaneously extruding under pressure two superimposed spaced flat strips of chewing gum of one type, means for elevating and advancing the upper strip of gum, means for lowering and advancing the lower strip of gum, means in advance of said gum extruding means and between said elevating and advancing means for extruding under pressure a single flat strip of chewing gum of a second type in the same direction as the advancing spaced strips of gum, said last named extruding means having two feed hoppers, each positioned beyond the running confines of all of the advancing strips, said last named extruding means also having screw means therein for receiving gum fed into both of the hoppers, forcing it from the bottom of the hoppers to the center of the extruding means and thence through a slot at right angles to the screw means, and means for joining the three strips to form a laminate.

LOUIS WILLIAM MAHLE.

(References on following page)

REFERENCES CITED

The following references are of record in the file of this patent:

UNITED STATES PATENTS

| Number | Name | Date |
|---|---|---|
| 122,602 | Gunther | Jan. 9, 1872 |
| 155,602 | Wiegand | Oct. 6, 1874 |
| 518,942 | Duhrkop | May 1, 1894 |
| 571,921 | Harton | Nov. 24, 1896 |
| 797,276 | Glauser | Aug. 15, 1905 |
| 1,242,562 | Laskey | Oct. 9, 1917 |
| 1,527,262 | Martin | Feb. 24, 1925 |
| 1,542,710 | Laskey | June 16, 1925 |
| 1,582,945 | Van Luven | May 4, 1926 |
| 1,771,506 | Mustin | July 29, 1930 |
| 2,019,125 | Stewart | Aug. 24, 1937 |
| 2,133,441 | Fischer | Oct. 18, 1938 |
| 2,227,728 | Lombi | Jan. 7, 1941 |
| 2,261,977 | Deutsch | Nov. 11, 1941 |